(12) United States Patent
Segura et al.

(10) Patent No.: US 9,107,025 B2
(45) Date of Patent: Aug. 11, 2015

(54) NODE AND METHOD FOR COMMUNICATIONS HANDLING

(75) Inventors: Louis Segura, Saint-Laurent (CA); Hans Rönneke, Kungsbacka (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 237 days.

(21) Appl. No.: 13/527,607

(22) Filed: Jun. 20, 2012

(65) Prior Publication Data

US 2013/0003576 A1 Jan. 3, 2013

Related U.S. Application Data

(60) Provisional application No. 61/503,626, filed on Jul. 1, 2011.

(30) Foreign Application Priority Data

Jun. 19, 2012 (WO) ................. PCT/EP2012/061683

(51) Int. Cl.
*H04L 29/06* (2006.01)
*H04W 76/02* (2009.01)
*H04L 12/26* (2006.01)
(Continued)

(52) U.S. Cl.
CPC .................................... *H04W 4/005* (2013.01)

(58) Field of Classification Search
CPC ....... H04W 4/005; H04W 68/00; H04W 4/06; H04W 24/02; H04W 48/16; H04W 4/08; H04W 68/02; H04W 24/00; H04W 28/0215; H04W 72/042; H04W 92/18; H04W 24/10; H04W 52/0216; H04W 52/0219

USPC .................................. 370/252, 329, 392, 401
See application file for complete search history.

(56) References Cited

U.S. PATENT DOCUMENTS

| 2003/0026230 A1* | 2/2003 | Ibanez et al. ................... 370/338 |
| 2012/0110145 A1* | 5/2012 | Pinheiro et al. ............... 709/220 |
| 2012/0254890 A1* | 10/2012 | Li et al. ......................... 719/313 |

(Continued)

FOREIGN PATENT DOCUMENTS

CN    WO 2011134325 A1 * 11/2011

OTHER PUBLICATIONS

Alcatel-Lucent et al "IP Adressing considerations for MTC Devices", 3GPP Draft; S2-102905 MTC IP Addr, 3rd Generation Partnership Project (3GPP), Mobile Competence Centre; 650, Route des Lucioles; F-06921 Sophia-Antipolis Cedex; France, vol. SA WG2, No. Kyoto ; 20100510, May 14, 2010, XP 050435004, retrived on May 14, 2010; Section 1 Case 1, Section 2, Section 6.

(Continued)

*Primary Examiner* — Jamal Javaid
*Assistant Examiner* — Will Lin
(74) *Attorney, Agent, or Firm* — Rothwell, Figg, Ernst & Manbeck, P.C.

(57) ABSTRACT

Example embodiments disclosed herein may be directed towards a system, and corresponding method, for sending machine-to-machine (M2M) application specific parameters. These parameters may allow a network operator to guide M2M application behaviour in accordance with potentially limited recourses in the network. These parameters may also be used to provide IPv6 address information to a gateway node and/or M2M server and/or Service Capability Server (SCS).

31 Claims, 11 Drawing Sheets

(51) Int. Cl.
*H04W 4/00* (2009.01)
*H04W 40/00* (2009.01)

(56) References Cited

U.S. PATENT DOCUMENTS

2012/0287854 A1* 11/2012 Xie et al. .................. 370/328
2012/0302229 A1* 11/2012 Ronneke ................ 455/422.1

OTHER PUBLICATIONS

Orange "IPv6 addressing", 3GPP Draft; S2-112742_SIMTC_IPV6 Adressing, 3rd Generation Partnership Project (3GPP), Mobile Competence Centre; 650, Route des Lucioles; F-06921 Sophia-Antipolis Cedex; France, vol. SA WG2, No. Xi'An; 20110516, May 23, 2011, XP050525760, retrived on May 23, 2011; The whole document.

Telefron AB LM Ericsson et al "MTC Device Activation Procedure" 3GPP Draft; GP-100885—MTC Device Activation Procedure, 3rd Generation Partnership Project (3GPP), Mobile Competence Centre; 650, Route des Lucioles; F-06921 Sophia-Antipolis Cedex; France, vol. TSG Geran, No. Jeju; 20100517, May 12, 2010, XP 050417121, retrived on May 12, 2010; Section 1-8, Annex A.

Sierra Wireless et al "Update to MTC Device Trigger Gateway Solution", 3GPP Draft; S2-112299 Device Trigger Gateway Update V3, 3rd Generation Partnership Project (3GPP), Mobile Competence Centre; 650, Route des Lucioles; F-06921 Sophia-Antipolis Cedex; France, vol. SA WG2, No. Xi'An; 20110516, May 11, 2011, XP 050525323, retrived on May 11, 2011; The whole document.

"3rd Generation Partnership Project, Technical Specification Group Services and Systems Aspects; System Improvements for Machine-Type Communications; (Release 11)", 3GPP Standard; 3GPP TR 23.888, 3rd Generation Partnership Project (3GPP), Mobile Competence Centre; 650, Route des Lucioles; F-06921 Sophia-Antipolis Cedex; France, vol. SA WG2, No. V1.3.0, Jun. 3, 2011, pp. 1-130, XP 050552911, retrieved on Jun. 3, 2011; Section 1-8, Annex A.

"3rd Generation Partnership Project; Technical Specification Group Services and Systems Aspects; Service Requirments for Machine-Type Communications (MTC); Stage 1 (Release 10)", 3GPP Standard; 3GPP TR 22.368, 3rd Genertation Partnership Project (3GPP), Mobile Competence Centre; 650, Route des Lucioles; F-06921 Sophia-Antipolis Cedex; France, vol. SA WG1, No. V10.5.0, Jun. 20, 2011, pp. 1-17, XP 050553359, retrieved on Jun. 20, 2011; The whole docuement.

International Search Report and Written Opinion issued by the European Patent Office on Nov. 6, 2012 in corresponding international application PCT/EP2012/061683.

* cited by examiner

NODE AND METHOD FOR COMMUNICATIONS HANDLING

RELATED APPLICATIONS

This application claims the benefit of U.S. Provisional Application No. 61/503,626, filed on Jul. 1, 2011. This application also claims the benefit of Patent Cooperation Treaty (PCT) Application No. PCT/EP2012/061683. The entire teachings of the above applications are incorporated herein by reference.

BACKGROUND

Machine-to-Machine (M2M) is a technology which enables both wireless and wired systems to communicate with other devices. M2M communications may utilize a device (e.g., a meter) to capture an event (e.g., temperature or an energy level), which is relayed through a network (e.g., wireless, wired or hybrid) to an application (e.g., a software program), that translates the captured event into meaningful information (e.g., a user consumption reading and associated price).

SUMMARY

With the increasing use of mobile communications, current estimates indicate that a large number of users (e.g., in the range of 50 billion) may utilize M2M communications at any given time in the relatively close future. Thus, problems may arise with the risk of overloading when large groups of terminals (e.g., as in M2M) simultaneously try to access the network. Additionally, problems also arise in the in the establishment of a connection with an M2M device and the network. Problems also arise in providing communications between the M2M device and an M2M application server. Furthermore, the full IPv6 address of the M2M device is typically not known in the GGSN/PGW and the MTC Server/SCS/MTC Application. The full IPv6 address is required in the MTC Server/SCS/MTC Application to initiate Mobile Terminated Communication.

Thus, at least one example object of some of the example embodiments described herein is to provide efficient communications between an M2M device and application server, in particular, during an establishment of a communication session. The example embodiments have at least the example advantage that utilized system resources may be reduced.

Thus, some of the example embodiments may be directed towards a method, in a first network node, for communications handling with a second network node. The first and second network nodes are comprised in a communications network. The method comprises determining, within the first network node, at least one M2M application specific parameter. The method further comprises transmitting the at least one M2M application specific parameter to second network node, during an establishment of a communication session. The at least one M2M application specific parameter is not modified during said transmitting.

Some of the example embodiments may be directed towards a first network node, for communications handling with a second network node. The first and second network nodes are comprised in a communications network. The first network node comprises processing circuitry configured to determine, within the first network node, at least one M2M application specific parameter. The first network node further comprises radio circuitry configured to transmit the at least one M2M application specific parameter to second network node, during an establishment of a communication session. The at least one M2M application specific parameter is not modified during the transmission.

Some of the example embodiments may be directed towards a method, in a (M2M) device for communication handling. The M2M device is comprised in a radio network. The method comprises transmitting, to a GGSN or a PGW, a full IPv6 address during an establishment of a communications session.

Some of the example embodiments may be directed towards a M2M device for communication handling. The M2M device is comprised in a radio network. The M2M device comprises radio circuitry configured to send, to a GGSN or a PGW, a full IPv6 address during an establishment of a communications session.

DEFINITIONS

3GPP 3rd Generation Partnership Project
AA Accounting Accept/Accounting Answer
AAA Authentication, Authorization and Accounting
AT Attention
CN Core Network
EPC Evolved Packet Core
EPS Evolved Packet System
E-UTRAN Evolved UTRAN
GERAN GSM Edge Radio Access Network
GGSN Gateway GPRS Support Node
GPRS General Packet Radio Service
GSM Global System for Mobile communications
HSS Home Subscriber Server
IE Information Element
IID Interface Identifier
IMSI International Mobile Subscriber Identity
IPv4 Internet Protocol version 4
IPv6 Internet Protocol version 6
LTE Long-Term Evolution
M2M Machine-to-Machine
MME Mobility Management Entity
MNO Mobile Network Operator
MT Mobile Terminal
MTC Machine Type Communication
NAS Non-Access Stratum
PCO Protocol Configuration Option
PGW PDN Gateway
PDN Packet Data Network
PDP Packet Data Protocol
RADIUS Remote Authentication Dial In User Service
SAU Simultaneously Attached User
SCS Service Capability Server
SGSN Serving GPRS Support Node
SGW Serving Gateway
SIMTC System Improvements for Machine-Type Communication
TA Terminal Adaptor
TE Terminal Equipment
UE User Equipment
UMTS Universal Mobile Telecommunications System
UTRAN Universal Terrestrial Radio Access Network
XML Extensible Markup Language

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments presented herein. However, the example embodiments may be practiced in other manners that depart from these specific details. In other instances, detailed descriptions of well-known methods and elements are omitted so as not to obscure the description of the example embodiments. It should be appreciated that the term M2M device, MTC device, or terminal may be used interchangeable throughout the following description.

System Overview

Figure 1:
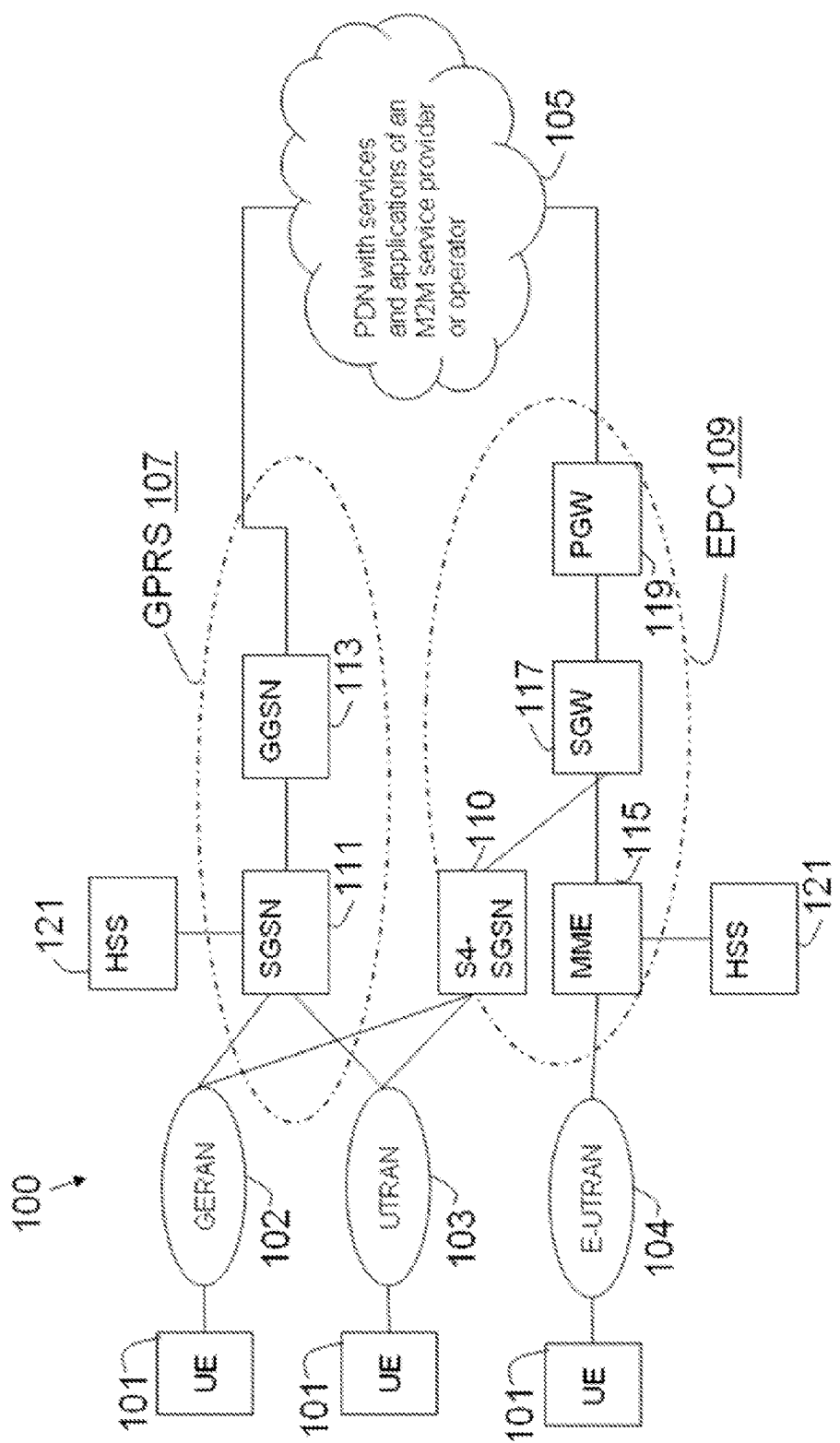
FIG. 1 is an illustrative example of a wireless communications system.

For the purpose of providing an explanation of the example embodiments, a problem will first be identified and discussed. Mobile machine-to-machine (M2M) communications play an increasingly prominent role in carrier networks and IT operations. FIG. 1 provides an example of a M2M communication network 100. As shown in FIG. 1, a User Equipment (UE) or M2M device 101 may be in communication with a Universal Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to the operator or application server 105, the UTRAN/E-UTRAN/GERAN subsystem 102-104 may be in communication with a General Packet Radio Service (GPRS) subsystem 107 or an Evolved Packet Core (EPC) subsystem 109.

The GPRS subsystem 107 may comprise a Serving GPRS Support Node (SGSN) 111, which may be responsible for the delivery of data packets to and from the mobile stations within an associated geographical service area. The SGSN 111 may also be responsible for packet routing, transfer, and mobility management. The GPRS subsystem 107 may also include a Gateway GPRS Support Node 113, which may be responsible for the interworking between the GPRS subsystem 107 and the operator or application server 105.

The EPC subsystem 109 may comprise a Mobility Management Entity 115, which may be responsible for idle mode UE tracking, paging procedures, and attachment and activation processes. The EPC subsystem may also comprise a Servicing Gateway (SGW) 117, which may be responsible for the routing and forwarding for data packets. The EPC subsystem may also include a Packet data network Gateway (PGW) 119, which may be responsible for providing connectivity from the UE 101 to the operator of application servers 105. Both the SGSN 111 and the MME 115 may be in communication with a Home Subscriber Server (HSS) 121, which may provide device identification information, an International Mobile Subscriber Identity (IMSI), etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

As the use of M2M communications increase, the demands on the wireless network also increase. Thus, as a result of this increased demand, a number of problems arise in the system illustrated in FIG. 1. Current estimates indicate that a large number of users (e.g., in the range of 50 billion) may utilize these networks at any given time in the relatively close future. Thus, problems may arise with the risk of overloading when large groups of terminals (e.g., as in M2M) simultaneously try to access the network.

Furthermore, M2M devices often generate high signalling loads towards and inside the network compared to the typically low data consumption and their low mobility. Having a large number of M2M devices communicating infrequently with the network may lead to unnecessary consumption of network resources to maintain a high number of simultaneously attached users (in SGSN/MME) and PDP/PDN Contexts (in GGSN/P-GW). Operators have complained that due to the expected low price of M2M subscriptions, that makes the business model for M2M difficult since the price for CN nodes are usually based on SAU & PDP/PDN connection capacity. Also, a network featuring a very large number of inactive connected M2M devices may cause problems when network nodes try to recover after network problems or outages.

Furthermore, the full IPv6 address of the M2M device is typically not known in the GGSN/PGW and the MTC Server/MTC Application. The full IPv6 address is required in the MTC Server/SCS/MTC Application to initiate Mobile Terminated communication.

Today, operators lack the ability to control M2M Application behaviour in accordance with balancing available resources with respect to number of SAU and PDP contexts. Thus, in order to address the above mentioned problems example embodiments are presented herein where MTC applications may reside on the TE component of a UE. Currently the TE has no means to determine the optimal settings regarding how long the MT should remain attached to the network, how long the PDP context should be maintained, or if the M2M device should periodically connect to the network. Thus, some of the example embodiments provided herein provide informative parameters to the TE through the use of a protocol configuration option (PCO) based solution.

Thus, example embodiments presented herein may be directed towards alleviating problems associated with M2M devices. Specifically, some of the example embodiments presented herein provide means for increased communications between the M2M device, gateway nodes (e.g., GGSN/PGW) and/or the M2M application server.

Specifically, some example embodiments may be directed towards the exchange of application specific M2M parameters may allow for a network operator to guide the M2M application behavior in accordance with potentially limited SAU and PDP context resources in the network. Alternatively, the parameters may be provided by M2M application server (or M2M service provider) when PDP/PDN connections are established. This would give the M2M service provider high flexibility in defining the communication. The network operator may still be in control of consumed resources, for example by having an agreement with the M2M service provider where the attach and connection time per month has an upper limit. It should also be appreciated that the user equipment or the M2M device may be configured to send such parameters to the network operator and/or M2M application server. It some example embodiments the user equipment or M2M device may be configured to supply information which is locally configured or constructed within the user equipment.

Some example embodiments may also be directed towards providing the gateway node and/or the M2M server with the full IPv6 address of the M2M device thereby allowing for direct communication. In some example embodiments it may be the UE who provides such information.

According to some example embodiments, a protocol configuration option (PCO) based communications handling may provide operators the ability to pass such information to the M2M application on the "TE" to control the GPRS/UMTS/LTE modem (i.e. the "MT"). At PDP Context Activation Accept the PCO may be comprised in the message when the network wishes to transmit (protocol) data (e.g. configuration parameters, error codes) to the MT. Following a PDP Context activation an M2M application on the TE can "read" the dynamic data (i.e., Clause 10.1.23 PDP Context Read Dynamic Parameters TS 23.007) in the PCO, according to some of the example embodiments.

These M2M parameters may be intended to be used by a M2M application running on the TE to control the MT (e.g., thru AT commands issued by application to GPRS/UMTS/LTE modem to Detach, Activate/Deactivate PDP context) as per network operator configuration. These parameters may also allow the operator to guide the M2M application behavior in accordance with potentially limited SAU and PDP context resources in the network. Alternatively, the parameters may be provided by the 3rd party M2M service provider when PDP/PDN connections are established. That would give the service provider high flexibility in defining the communication. The operator may still be in control of consumed resources for example by having an agreement with the M2M service provider where the attach and connection time per month has an upper limit.

Some example embodiments may comprise additional specific "M2M parameters" to be added to the PCO passed to the network as part of the PDP Context Activation Request or Attach/PDN Connection Establishment Request messages. These can be used to provide IPv6 address information, e.g. IID, to the GGSN/PGW. The GGSN/PGW can then if needed construct the full IPv6 address and pass the address further on to the MTC Server/SCS/MTC Application in the external network.

Figure 2:
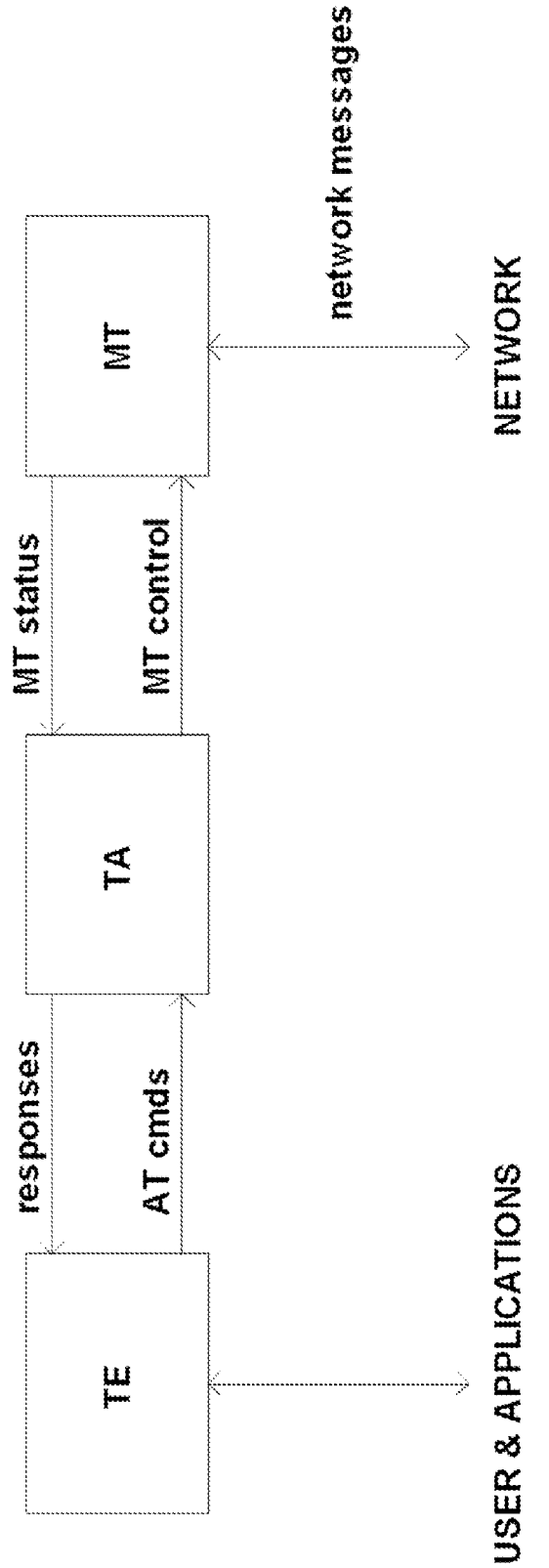
FIGS. 2-7 are message passing diagrams, according to some of the example embodiments.

FIG. 2 illustrates an example of an AT command set for a user equipment taken from TS 23.007. Applications residing in the TE may control the MT through the AT commands. The commands may also allow the TE to "read" dynamic data (i.e., Clause 10.1.23 PDP Context Read Dynamic Parameters). TS 23.007 assumes an abstract architecture comprising a TE (e.g. a computer) and a MT interfaced by a TA (see FIG. 2). The span of control of the defined commands allows handling of any physical implementation that this abstract architecture may lead to, for example, TA, MT and TE as three separate entities; the TA integrated under the MT cover, and the TE implemented as a separate entity; the TA integrated under the TE cover, and the MT implemented as a separate entity; and the TA and MT integrated under the TE cover as a single entity. The commands described in 23.007 may be observed on the link between the TE and the TA. However, most of the commands retrieve information about the MT, not about the TA.

3GPP SIMTC Requirements (SA1 22.368, clause 7.1.1) indicate that MTC devices may be kept offline or online when not communicating, depending on operator polices and MTC application requirements. Thus, according to some of the example embodiments, a protocol configuration option (PCO) based communications handling provides the operators the means to pass such information to the M2M application on the "TE" to control the GPRS/UMTS/LTE modem (i.e. the "MT").

At PDP Context Activation Accept the PCO may be comprised in the message when the network wishes to transmit (protocol) data (e.g., configuration parameters, error codes or messages/events) to the MT. In some example embodiments, "M2M parameters" application specific parameters may be added to the PCO. Thus, following PDP Context activation the TE can "read" the dynamic data (i.e. Clause 10.1.23 PDP Context Read Dynamic Parameters) in the PCO.

Figure 3:
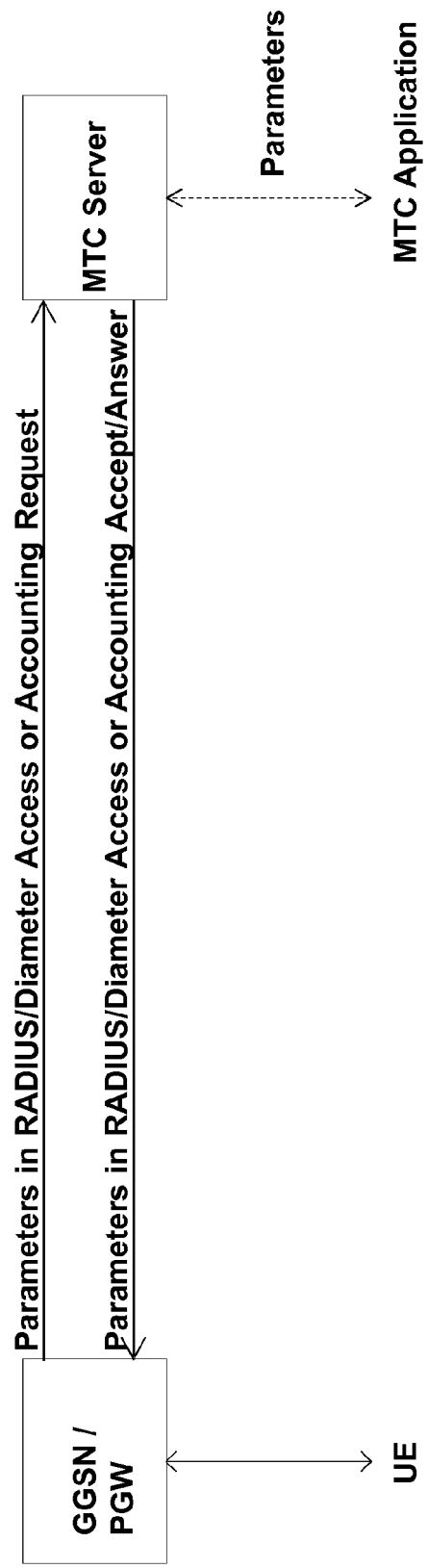

These M2M parameters may be intended to be used by the M2M application running on the TE to control the MT (e.g. thru AT commands issued by application to GPRS/UMTS/LTE modem to Detach, Activate/Deactivate PDP context) as per network operator configuration. The parameters may be provided by the MNO or by the M2M Service Provider. In the later case a procedure for passing the parameters from the MTC Server (or the MTC Application) to the GGSN/PGW is required. This can be done as shown in FIG. 3, through the use of RADIUS and/or AAA signaling.

When the M2M Application Control parameters are provided from the MTC Server (or the MTC Application in the network) instead of from the MNO, they may be sent in the Access Accept (RADIUS)/AA-Answer (Diameter) message to the gateway node or GGSN/PGW. They may alternatively be passed in the Accounting Accept/Accounting-Answer (start) message. These messages are defined in 3GPP TS 29.061 as part of the RADIUS and Diameter protocols. The parameters may be passed as separate parameters in the RADIUS/Diameter protocol (e.g. as sub-attributes of the 3GPP Vendor-Specific attribute), or compiled into a container message that is passed transparently (or unmodified) from the MTC Server/MTC Application through the network to the user equipment or M2M device.

The GGSN may then assemble the PCO IE and forward it to the MT in the user equipment in the PDP Context Activation Response message or PDP Context Modification Response message. A PGW may forward the PCO to the MT in the user equipment or M2M device in the PDN Connection Establishment Response message or in a PDN Connection Modification Response message. The parameters may then be passed to the TE part of the UE as shown in FIG. 2.

Figure 4:
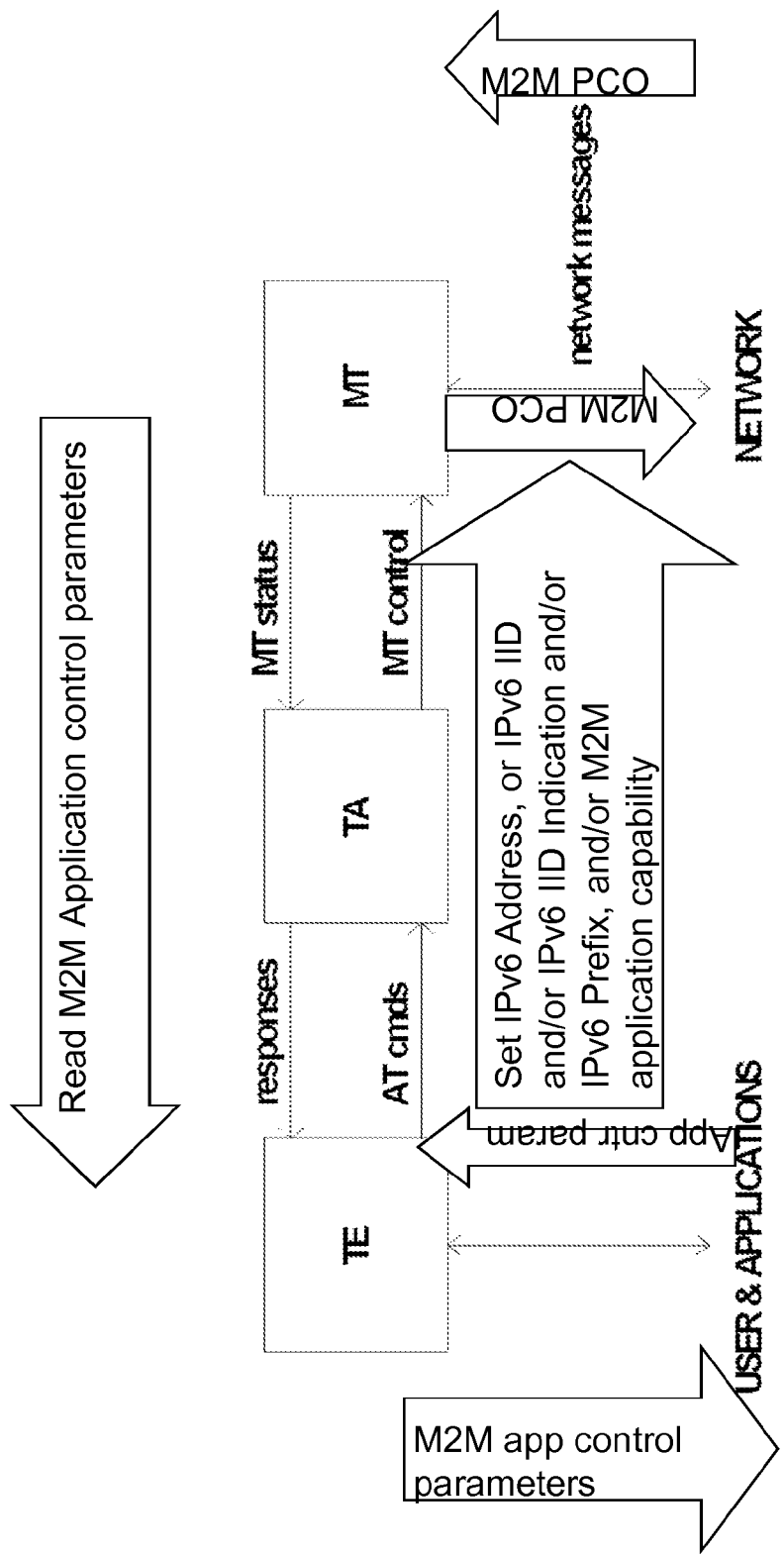

For the additional M2M parameters that relate to the IPv6 address (UE IPv6 address, UE IPv6 IID or IPv6 IID Indication) these may be processed by the GGSN/PGW and passed in the existing parameters Framed-IPv6-Prefix and Framed-Interface-Id to the MTC Server, as illustrated in FIG. 4. They may then be passed to the MTC Server as part of the RADIUS/Diameter signaling over Gi/SGi. Signaling may be done, for example, when a PDP/PDN Connection is created or deleted.

In the context of dynamic IPv6 assignment the user equipment or M2M device may not provide the full IPv6 address at initial Attach. In this case, according to some of the example embodiments, the GGSN/PGW may, having knowledge of the IPv6 Network Prefix and the user equipment or M2M device provided IPv6 IID (or having knowledge of the IPv6 Network Prefix and the link-local IID used by the user equipment or M2M device), construct the full IPv6 address and pass the address or address information further on to the MTC server/SCS/MTC application in the external network. Alternately, in some example embodiments, the GGSN/PGW may defer the full IPv6 address construction to the MTC server by providing the IPv6 Network Prefix and the UE IPv6 IID in the Radius/Diameter messages.

In the context of static IPv6 assignment the user equipment or M2M device may provide its full IPv6 address at initial Attach. In this case, according to some of the example embodiments, the GGSN/PGW receives the full IPv6 address and may pass the address or address information further on to the MTC server/SCS/MTC application in the external network. Alternately, in some example embodiments, the GGSN/PGW may defer the full IPv6 address construction to the MTC server by providing the IPv6 Network Prefix and the UE IPv6 IID in the Radius/Diameter messages.

M2M Application Specific Parameters

According to some of the example embodiments, various M2M application specific parameters may be provided. A few non-limited examples of such M2M application specific parameters are provided below.

M2M Application Capability Information

According to some of the example embodiments, this M2M application specific parameter (a device capability of the M2M device) may provide the means to pass application capabilities from the M2M application in the user equipment or M2M device to the network. This parameter may also serve as means for the user equipment or M2M device to request the network to return M2M PCO parameters.

The M2M application capabilities further allow the device to indicate that an M2M application that is contacting the network, perhaps also indicating any necessary special M2M properties. An example of such a special M2M property may be whether it is fixed, low mobility or mobile MTC application, operating under low power requirements, whether application reports data periodically or asynchronously, M2M applications it is supporting etc.

M2M Online/Offline Control

According to some of the example embodiments, this example M2M application specific parameter may be used to indicate that the M2M device is recommended to detach (go offline) if M2M applications on device are not expecting to transmit data within a specified amount of time (e.g., 120 minutes). A value of 0 may indicate that the TE should not power down the MT such that MT may remain attached. Such a parameter may be regarded as device control instructions to be carried out by the M2M device M2M PDP Context Control According to some of the example embodiments, this example M2M application specific parameter may be used to suggest M2M device behavior regarding maintaining a PDP context session and help provide a balance between many short sessions and long sessions without data transfer. Furthermore, the parameter may indicate that if M2M device is expecting to pass data less frequently than a specified amount of time (e.g., 60 minutes), a new PDP Context may be used for the transmission (i.e. deactivate this context). In the context of LTE this parameter may not be intended to be used for the default bearer which remains activate as per existing basic EPS always on behavior. Such a parameter may be regarded as device control instructions to be carried out by the M2M device.

M2M Network Contact Interval

According to some of the example embodiments, this example M2M application specific parameter may indicate that the M2M device is expected to power up/attach and setup a PDP context every interval of a predetermined set of time (e.g., a number of hours within a range of 1-65535) to allow for network MT communication. Such a parameter may be regarded as mobility and session management characteristics to be carried out by the M2M device.

MTC Server Address(es)

According to some of the example embodiments, this example M2M application specific parameter may be used to indicate the address of a MTC server to contact. Such a parameter may be regarded as mobility and session management characteristics associated with the M2M device.

MTC Server Fully Qualified Domain Name (FQDN)

According to some of the example embodiments, this example M2M application specific parameter may be used to indicate the domain name of a MTC server to contact.

Such a parameter may be regarded as mobility and session management characteristics associated with the M2M device.

MTC Server URL

According to some of the example embodiments, this example M2M application specific parameter may be used to indicate the URL of a MTC server to contact. Such a parameter may be regarded as mobility and session management characteristics associated with the M2M device.

The above example, non-limiting list, of parameters may be configured on APN basis in GGSN/PGW. Alternately, the parameters may be set on an individual subscriber basis. In addition, the value returned could be influenced by time of day, current load in network or remaining resources (e.g. memory resources to store context) in network nodes (SGSN/MME, PGW).

According to some of the example embodiments, various M2M application specific parameters associated with IPv6 addressing may be provided. Non-limiting examples of such M2M application specific parameters associated with IPv6 addressing is provided below.

UE IPv6 Address

According to some of the example embodiments, this example M2M application specific parameter may comprise one or more full IPv6 address(es) (prefix and interface id) used by the user equipment or M2M device if it has static IPv6 address(es) assigned. Such a parameter may be used, for example, when the user equipment or M2M device has knowledge of its full IPv6 address(es) before a connection is established.

UE IPv6 IID

According to some of the example embodiments, this example M2M application specific parameter may comprise one or more interface ID(s) as part of the IPv6 address(es) used by the user equipment or M2M device when it uses the normal IPv6 Stateless Address Auto-configuration procedure. It may select one or more IID, e.g. using a random method for integrity reasons, before it starts signaling to the network (e.g., attach or create dedicated bearer) that will establish a new PDP/PDN connection. The new PDP/PDN connection may be assigned a unique IPv6 Prefix by the GGSN/PGW that will be passed to the user equipment or M2M device using the normal Router Advertisements as part of the IPv6 Stateless Address Auto-configuration procedure.

When the GGSN/PGW receives the Create PDP Context Request/Create Session Request with one or more user equipment or M2M device IPv6 IID parameter in the PCO IE, it may combine the IID(s) with the IPv6 Prefix it assigns to the new PDP/PDN Connection and by that is has the full IPv6 address(es). The full IPv6 address(es) can then be passed to the MTC Server/SCS as part of RADIUS/Diameter signaling over Gi/SGi. FIG. 4 illustrates an example of UE IPv6 IID.

IPv6 IID Indication

According to some of the example embodiments, this example M2M application specific parameter may provide an indication from the user equipment or M2M device that it intends to use the Link-local IID, that may be provided by the network (GGSN/PGW) to the user equipment or M2M device, for also constructing its public IPv6 address in addition to the Link-local IPv6 address. Alternatively the IPv6 IID Indication can be used to indicate the usage of some other pre-agreed IID.

The Link-local IID may be passed to the user equipment or M2M device as part of the Activate PDP Context Accept/Create Session Response messaging. The new PDP/PDN connection may be assigned a unique IPv6 Prefix by the GGSN/PGW that may be passed to the user equipment or M2M device using the normal Router Advertisements as part of the IPv6 Stateless Address Auto-configuration procedure.

Figure 5:
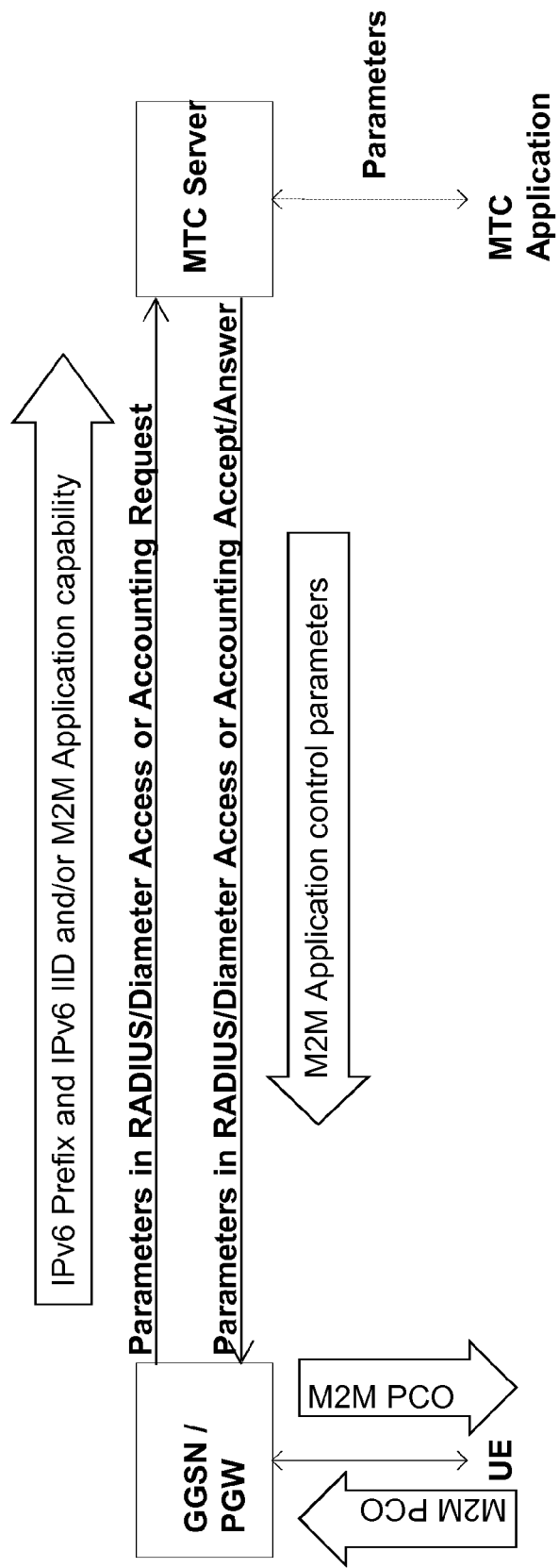

When the GGSN/PGW receives the Create PDP Context Request/Create Session Request with an IPv6 IID Indication parameter in the PCO IE, it may combine the Link-Local IID it has assigned to the user equipment or M2M device with the IPv6 Prefix it will assign to the new PDP/PDN Connection and by that it has the full IPv6 address. This full IPv6 address (or the IPv6 Prefix and the IPv6 IID) may then be passed to the MTC server/SCS as part of RADIUS/Diameter signaling over Gi/SGi. The IPv6 IID indication may be used as an alternative to the UE IPv6 IID. FIG. 5 illustrates an example of IPv6 IID indication.

M2M Application Container Message

Figure 6:
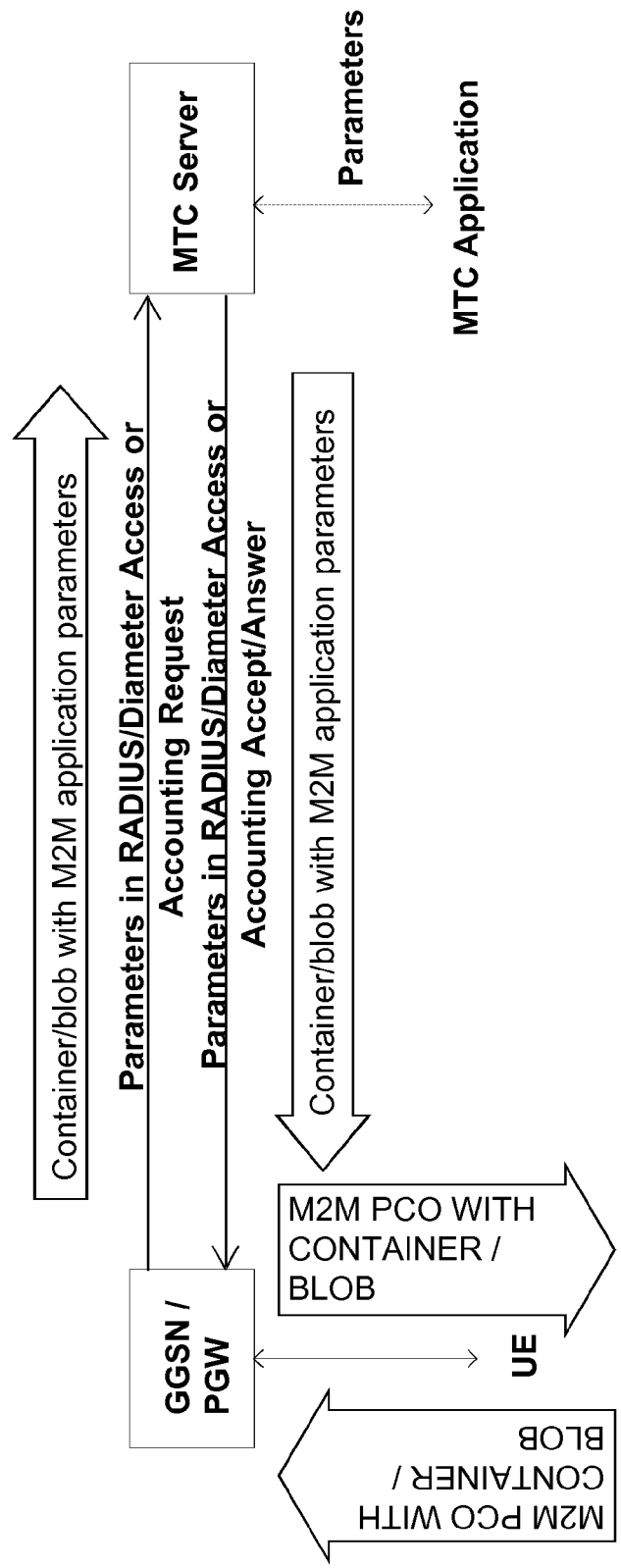
Figure 7:
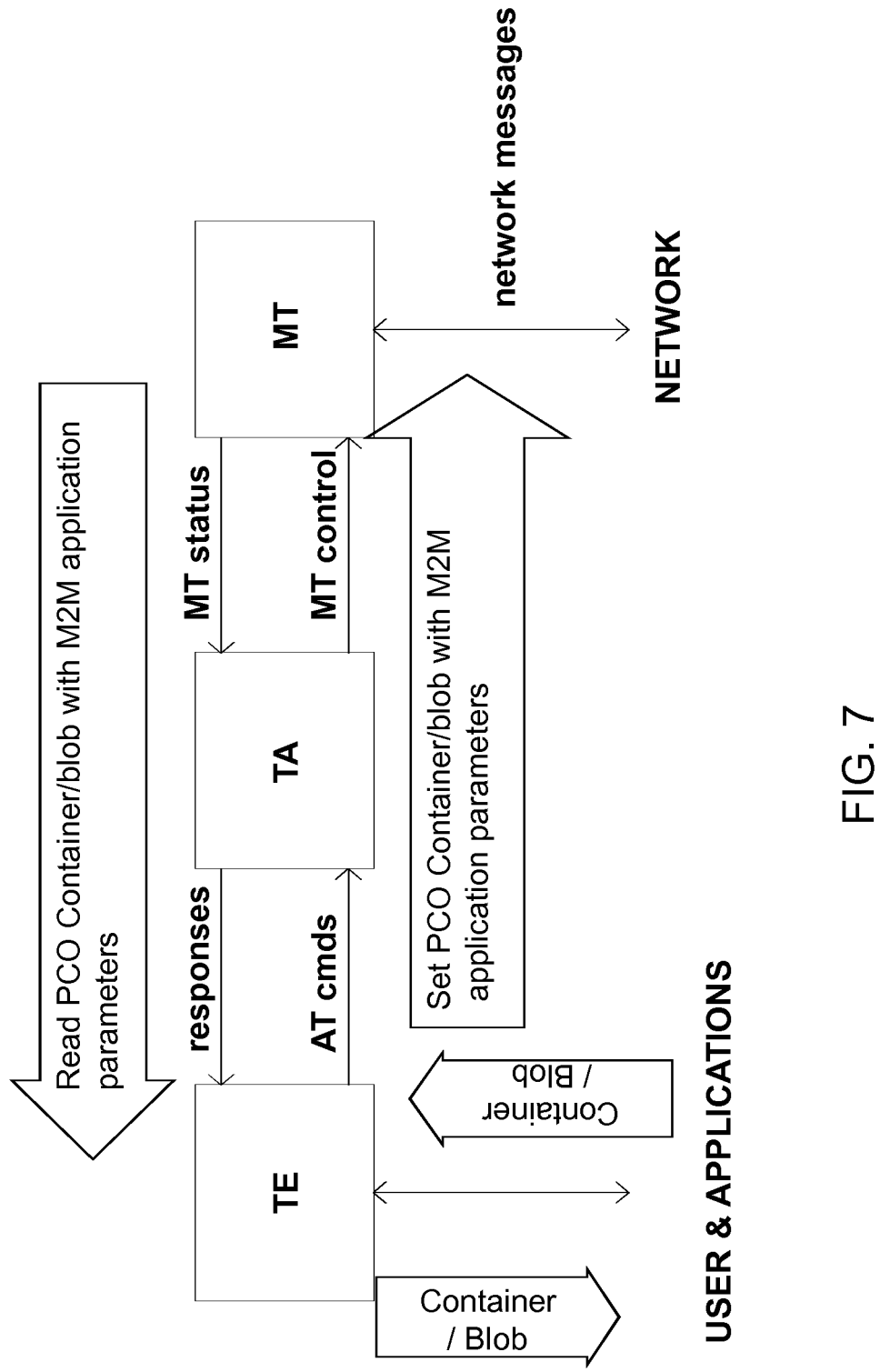

According to some of the example embodiments, this example M2M application specific parameter may be a new PCO element that is passed end-to-end between the user equipment or M2M device MTC application and the MTC server transparently (e.g., without modification) through the 3GPP network. This container message may carry any necessary M2M application parameters required to be processed in the user equipment or M2M device MTC application and the MTC server but not defined within 3GPP. For example, this container message me be carrying XML tagged MTC application parameters only known by the MTC application residing on the user equipment or M2M device and the MTC application server. This may be handled as a new expanded or evolved PCO without the existing PCO size restrictions (i.e. 256 bytes). It may then be passed/returned by the GGSN/PGW to MTC server using a similar new "container" radius/diameter parameter or message. The M2M application container message may be used in the transportation of measured or recorded data (e.g., from the user equipment or M2M device to the M2M server) or data/measurement instructions (e.g., from the M2M server to the user equipment or M2M device). FIGS. 6 and 7 illustrate examples of M2M application containers or container messages.

Non-limiting examples of M2M application specific parameter value settings will now be provided. First, consider the case of MTC devices which have infrequent mobile originated communications, therefore the network may set very short values. Example M2M application specific parameters may be: M2M online/offline Control=10 minutes; M2M PDP Context lifetime control=5 minutes; and M2M Network Contact Interval=168 hours (i.e. once a week).

A further non-limiting example may be the case where an MTC application may always be expected to be reached via SMS and may be ordered to remain attached to the network for a significant period whereas the PDP context is short lived (enough for context to be created to receive the PCO). Example M2M application specific parameters may be: M2M online/offline Control=0 (always remain attached); and M2M PDP Context control=5 (short lived PDP context).

Yet a further example may be the case where the network would like to the MTC device to contact an MTC Server every 48 hrs without exception. Example M2M application specific parameters may be: M2M online/offline Control=10 minutes; M2M PDP Context control=10 minutes; M2M Network Contact Interval=48 hours; MTC server address; MTC Server FQDN; MTC Server URL; and the use of a M2M Application Container message.

Example Node Configuration

Figure 8:
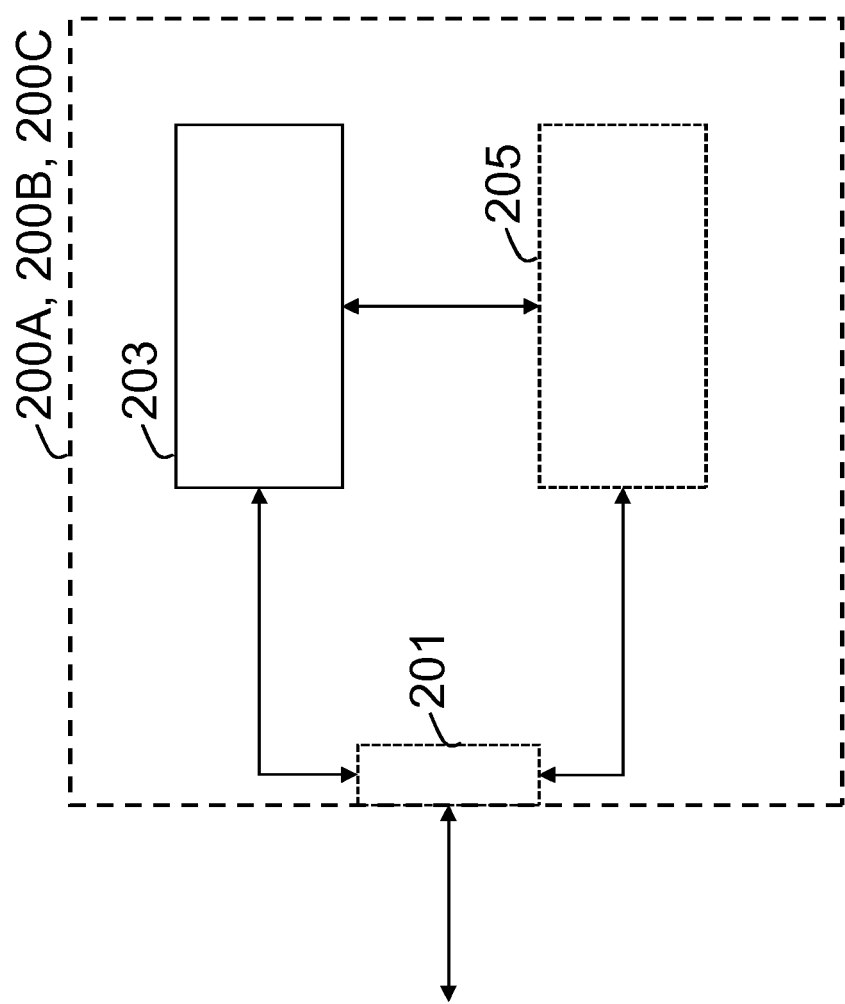
FIG. 8 is an illustration of a node configuration, according to some of the example embodiments.

FIG. 8 illustrates a M2M network node 200A-200C which may be configured to utilize some of the example embodiments disclosed herein, wherein the node 200A may represent a M2M device, the node 200B may represent a GGSN/PGW node and the node 200C may represent a M2M application server. The node 200A-200C may comprise a radio circuitry or a communication port 201 that may be configured to receive and/or transmit communication data, instructions, and/or messages. It should be appreciated that the radio circuitry or communication port 201 may be comprised as any number of transceiving, receiving, and/or transmitting units or circuitry. It should further be appreciated that the radio circuitry or communication 201 may be in the form of any input/output communications port known in the art. The radio circuitry or communication 201 may comprise RF circuitry and baseband processing circuitry (not shown).

The node 200A-200C may also comprise processing circuitry 203 which may be configured to determine M2M application specific parameters. The processing circuitry 203 may be any suitable type of computation unit, e.g. a microprocessor, digital signal processor (DSP), field programmable gate array (FPGA), or application specific integrated circuit (ASIC), or any other form of circuitry. The node 200A-200C may further comprise a memory unit or circuitry 205 which may be any suitable type of computer readable memory and may be of volatile and/or non-volatile type. The memory 205 may be configured to store received, transmitted, and/or measured data, device parameters, communication priorities, and/or executable program instructions.

Example Node Operations and Messaging

Figure 9:
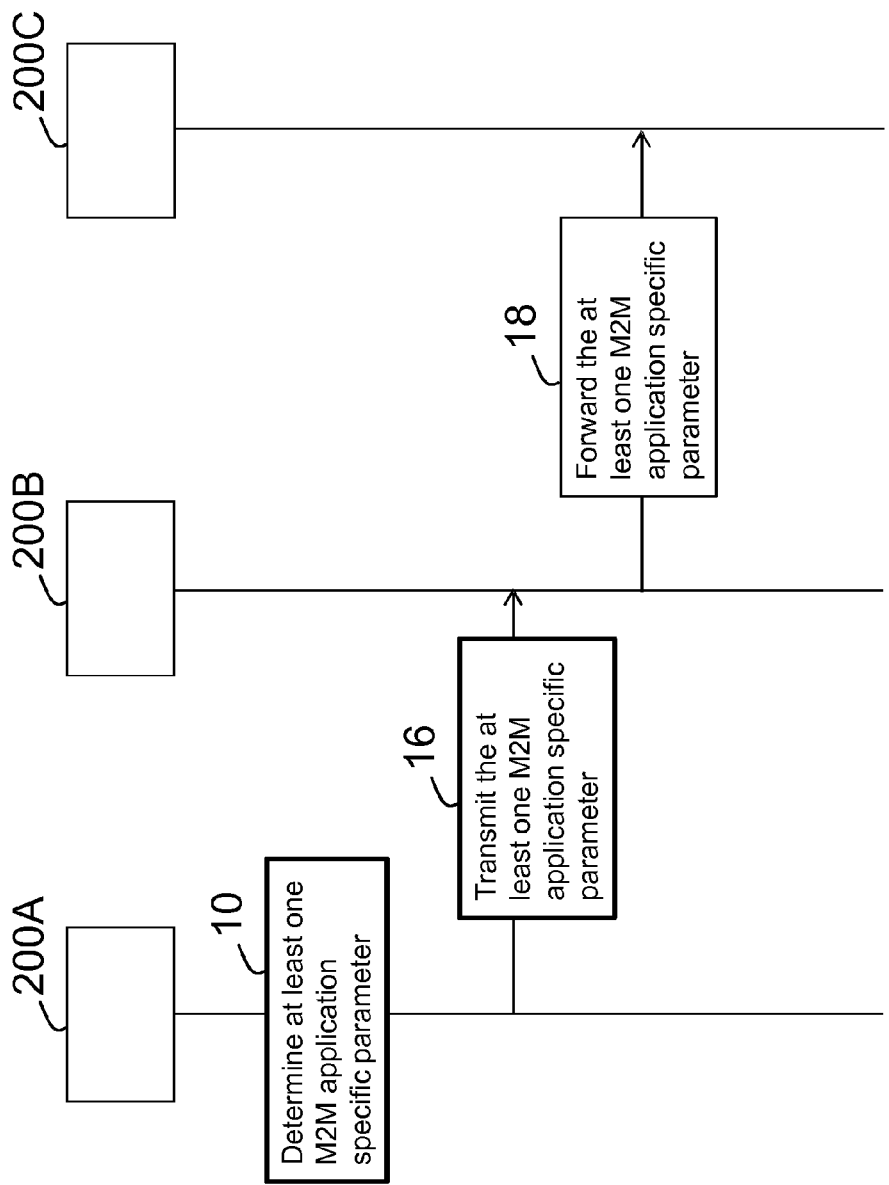
FIGS. 9-11 are messaging diagrams depicting example operations which may be taken by the node of FIG. 8, according to some of the example embodiments.
Figure 10:
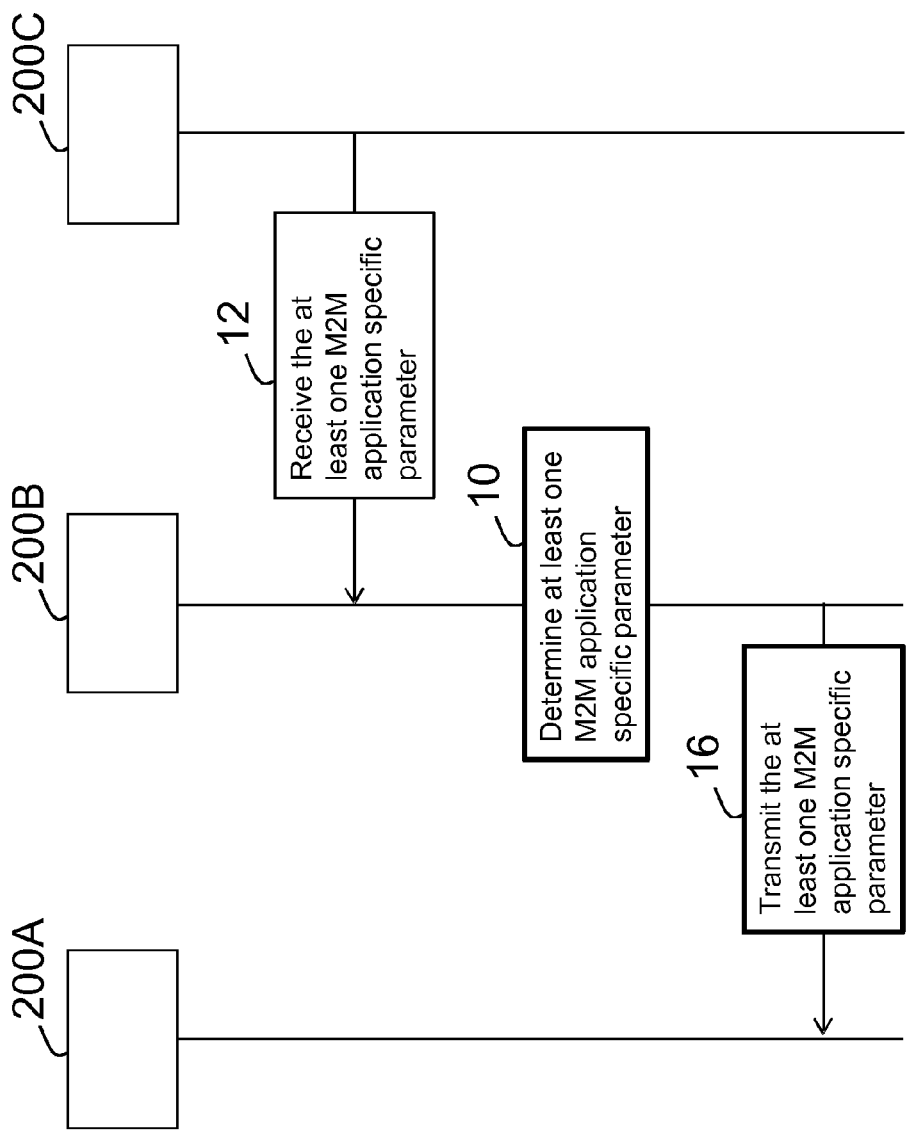
Figure 11:
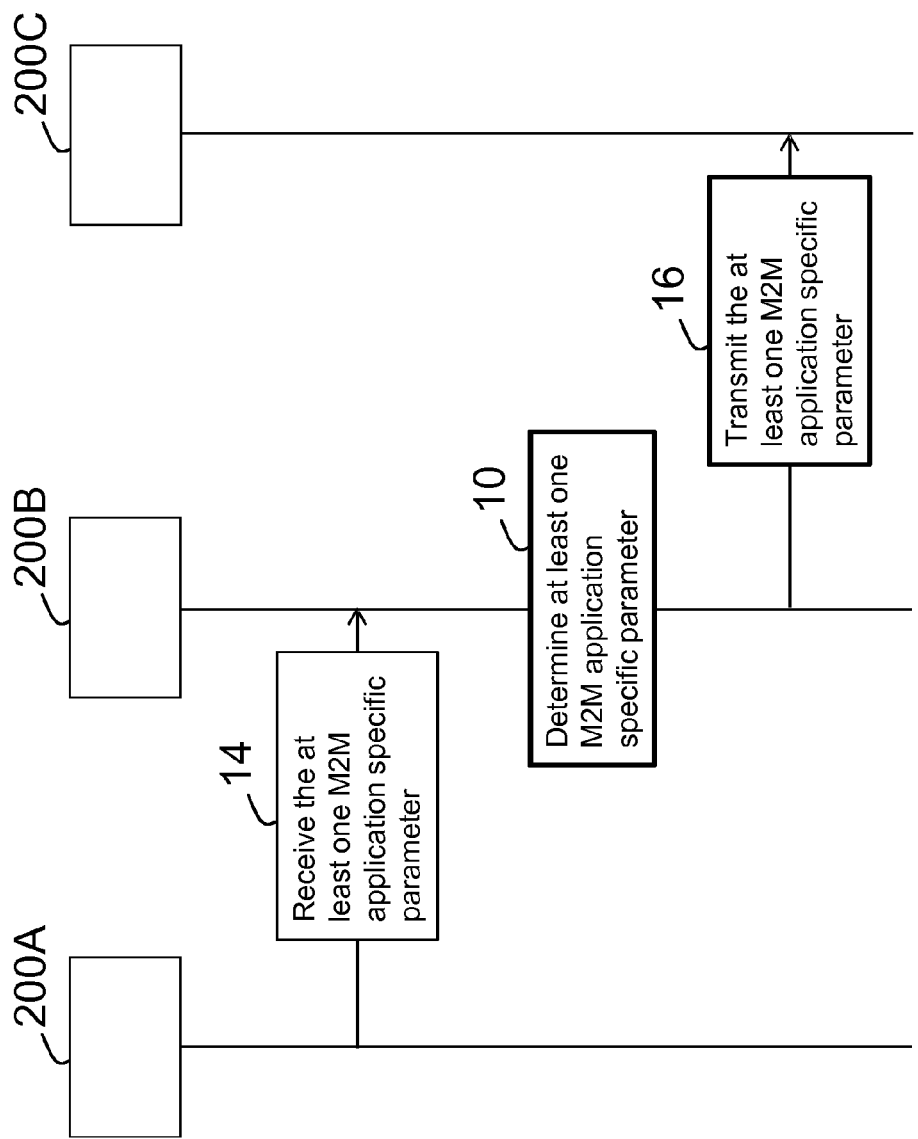

FIGS. 9-11 illustrate messaging diagrams depicting different example operations, which may be taken by the network node of FIG. 8, for communications handling between a first and second network node in a communications network. FIGS. 9-11 feature three network nodes 200A, 200B and 200C. According to some of the example embodiments, the three network nodes may generate, forward, and/or receive the various M2M application specific parameters discussed herein. The three network nodes may be the user equipment or M2M device 200A, a GGSN/PGW node 200B, and the M2M application server 200C. It should be appreciated that the M2M application server may also be a MTC server, a RADIUS server, a SCS server and/or an AAA server. According to some of the example embodiments, the communications network is an IPv4 or an IPv6 network.

It should also be appreciated that FIGS. 9-11 comprise some operations which are illustrated with a darker border and some operations which are illustrated with a lighter border. The operations which are comprised in a darker border are operations which are comprised in the broadest example embodiment. The operations which are comprised in a lighter border are example embodiments which may be comprised in, or a part of, or are further operations which may be taken in addition to the operations of the border example embodiments. It should be appreciated that these operations need not be performed in order. Furthermore, it should be appreciated that not all of the operations need to be performed. The example operations may be performed in any order and in any combination.

Operation 10

The first network node 200A, 200B is configured to determine 10 at least one M2M application specific parameter. The processing circuitry may be configured to determine the at least one M2M application specific parameter. The at least one M2M application specific parameter may comprise any of the example M2M application specific parameters presented herein or any other equivalent M2M application specific parameters which may be within the scope of the example embodiments. This operation is illustrated in FIGS. 9-11, where the first network node is the M2M device 200A in FIG. 9. In FIGS. 10 and 11 the first network node is the GGSN/PGW node 200B.

Example Operation 12

According to some of the example embodiments, the first network node may be a GGSN or a PGW node 200B and the second network node may be a user equipment of a M2M device 200A. In such an embodiment, the first network node 200B may be configured to receive 12 the at least one M2M application specific parameter from a M2M application server, a MTC server, a RADIUS server and/or an AAA server 200C. The processing circuitry 203 may be configured to receive the at least one M2M application specific parameter from the M2M application server, the MTC server, the RADIUS server and/or the AAA server 200C. This operation is illustrated in FIG. 10.

Example Operation 14

According to some of the example embodiments, the first network node may be a GGSN or a PGW node 200B and the second network node may be a M2M application server 200C. In such an embodiment, the first network node 200B may be configured to receive the at least one M2M application specific parameter from a M2M device 200A. The processing circuitry 203 may be configured to receive the at least one M2M application specific parameter from the M2M device 200A. This operation is illustrated in FIG. 11.

Operation 16

The first network node 200A, 200B is also configured to transmit 16 the at least one M2M application specific parameter to the second network node 200B, 200A, 200C during an establishment of a communication session, where the at least one M2M application specific parameter is not modified during the transmission. The processing circuitry 203 is configured to transmit the at least one M2M application specific parameter to the second network node 200B, 200A, 200C during the establishment of the communication session. This operation is illustrated in FIGS. 9-11.

According to some of the example embodiments, the at least one communication session may be a PDN connection or a PDP context communication establishment. According to some of the example embodiments, the transmitting is performed with a PCO.

According to some of the example embodiments, the first network node 200A is a M2M device and the second network node is a GGSN or PGW node 200B, as is illustrated in FIG. 9. In these example embodiments, the at least one M2M application specific parameter may be a IID portion of a full IPv6 address of the M2M device 200A, an indication that a specific IID has been or will be used in the M2M device 200A, and/or a full IPv6 address of the M2M device 200A. According to some of the example embodiments, the at least one M2M application specific parameter may also be data reported by the M2M device. According to some of the example embodiments, the at least one M2M application specific parameter may also be a device capability of the M2M device.

According to some of the example embodiments, the first network node may be a GGSN or PGW node 200B and the second network node may be a M2M device 200A, as is illustrated in FIG. 10. In these example embodiments, the at least one M2M application specific parameter may be device control instructions to be carried out by the M2M device 200A. According to some of the example embodiments, the at least one M2M application specific parameter may be mobility and session management characteristics of the M2M device 200A. In these example embodiments, it should be appreciated that the GGSN or PGW node 200B may receive the at least one M2M application specific parameters from a M2M application server 200C, as described in relation to example operation 12.

According to some of the example embodiments, the first network node may be a GGSN or PGW node 200B and the second network node may be a M2M application server 200C, as is illustrated in FIG. 11. In these example embodiments, the at least one M2M application specific parameter may be a IID portion of a full IPv6 address of a M2M device 200A, an indication that a specific IID has been or will be used in a M2M device 200A, and/or a full IPv6 address of the M2M device 200A. According to some of the example embodiments, the at least one M2M application specific parameter may be data reported by the M2M device 200A. According to some of the example embodiments, the at least one M2M application specific parameter may be a device capability of the M2M device 200A. According to some of the example embodiments, the at least one M2M application specific parameter may be mobility and session management characteristics of the M2M device 200A. In these example embodiments, it should be appreciated that the GGSN or PGW node 200B may receive the at least one M2M application specific parameters from a M2M device 200A, as described in relation to example operation 14.

Example Operation 18

According to some of the example embodiments, the first network node may be the M2M device 200A and the second network node may be the GGSN/PGW node 200B, as is illustrated in FIG. 9. The at least one M2M application specific parameter may be forwarded 18 by the GGSN/PGW node 200B to the M2M application server 200C. The processing circuitry 203 of the GGSN/PGW node 200B may be configured to forward the at least one M2M application specific parameter to the M2M application server 200C.

Conclusion

Example embodiments have been presented herein which provide for the transparent transmission of M2M application specific parameters throughout a network. In instances where MTC devices have low mobility and infrequent requirements for data transmission, the MTC devices need not be "always on" with a PDN connection and IP connectivity. Thus, some of the example embodiments may be employed to inform the network that the MTC device may be disconnected from the network.

The example embodiments allow for the introduction of large numbers of MTC devices in network without impacting 3GPP air interface, radio access network. Minimal 3GPP standards impact provides the MTC Application layer operating on the TE the necessary control parameters without significant impacts to existing 3GPP infrastructure and UE. Furthermore, this allows operators to make significant reuse of existing infrastructure and radio modems (MT) for M2M communication. Utilizing the example embodiments, operators may tune M2M application behavior as per operator policy and varied MTC application requirements.

Some example embodiments disclosed herein also allow for the passing of information regarding the IPv6 address from the UE to the MTC Server. Knowing the full IPv6 address may be crucial for an MTC Server since it can then initiate communication with the device. Without the IP address, communication must be initiated by the UE, and not from the network/MTC server. And from a network perspective it is better with a model where the MTC Server initiates communication, since that can avoid network overload situations. If one million UEs were programmed to report its status every hour sharp, the network would easily be overloaded.

The foregoing description of embodiments of the example embodiments, have been presented for purposes of illustration and description. The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein is described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, in a first network node, for communications handling with a second network node, the first and second network nodes being comprised in a communications network, the method comprising:
   determining, within the first network node, at least one Machine-to-Machine (M2M) application specific parameter; and
   transmitting, by said first network node, a message comprising said at least one M2M application specific parameter to said second network node, during an establishment of a communication session, wherein the at least one M2M application specific parameter is not modified during said transmitting, wherein
   the M2M application specific parameter comprises one or more of: a device capability of the M2M device, device control instructions to be carried out by the M2M device, mobility and session management characteristics of the M2M device, an Interface Identifier (IID) portion of a full Internet Protocol version 6 (IPv6) address of the M2M device, an indication that a specific IID has been or will be used in the M2M device, and a full IPv6 address of the M2M device,
   the first network node is one of: an M2M device, a gateway node, and Machine-Type Communication (MTC) server,
   when the first network node is the M2M device, the second network node is the gateway node, and the M2M application specific parameter comprises one or more of: said device capability of the M2M device, said IID portion of a full IPv6 address of the M2M device, an indication that a specific IID has been or will be used in the M2M device, and a full IPv6 address of the M2M device,
   when the first network node is the MTC server, the second network node is the gateway node, and the M2M application specific parameter comprises one or more of: device control instructions to be carried out by the M2M device, and mobility and session management characteristics of the M2M device,
   when the first network node is the gateway node, the second network node is one of: the M2M device and the MTC server, and
   when the first network node is the gateway node and the second network node is the M2M device, the M2M application specific parameter comprises one or more of: device control instructions to be carried out by the M2M device, and mobility and session management characteristics of the M2M device.

2. The method of claim 1, wherein the establishment of the communication session is a Packet Data Network (PDN) connection or a Packet Data Protocol (PDP) context communication establishment.

3. The method of claim 1, wherein the communications network is an Internet Protocol version 4 (IPv4) and or an Internet Protocol version 6 (IPv6) network.

4. The method of claim 1, wherein the transmitting is performed with a Protocol Configuration Option (PCO).

5. The method of claim 1, wherein the first network node is a M2M device and the second network node is a Gateway General Packet Radio Service Support Node (GGSN) or a Packet Data Network Gateway (PGW).

6. The method of claim 5, wherein the at least one M2M application specific parameter is data reported by the M2M device.

7. The method of claim 5, wherein the at least one M2M application specific parameter is forwarded by the second network node to a third network node, wherein the third network node is a M2M application server, a Machine-Type-Communication (MTC) server, a Service Capability Server (SCS), a Remote Authentication Dial In User Service (RADIUS) server, and/or an Authentication, Authorization and Accounting (AAA) server.

8. The method of claim 1, wherein the first network node is a Gateway General Packet Radio Service Support Node (GGSN) or a Packet Data Network Gateway (PGW), and the second network node is a M2M device.

9. The method of claim 8, wherein the determining further comprises receiving said at least one M2M application specific parameter from a M2M application server, a Machine-Type-Communication (MTC) server, a Service Capability Server (SCS) server, a Remote Authentication Dial In User Service (RADIUS) server, and/or an Authentication, Authorization and Accounting (AAA) server.

10. The method of claim 1, wherein the first network node is a Gateway General Packet Radio Service Support Node (GGSN) or a Packet Data Network Gateway (PGW), and the second network node is a M2M application server, a Machine-Type-Communication (MTC) server, a Service Capability Server (SCS) server, a Remote Authentication Dial In User Service (RADIUS) server, and/or an Authentication, Authorization and Accounting (AAA) server.

11. The method of claim 10, wherein the at least one M2M application specific parameter is data reported by a M2M device.

12. The method of claim 10, wherein the determining further comprises receiving, from a M2M device, the at least one M2M specific parameter.

13. The method of claim 1, wherein
the first network node is the MTC server,
the second network node is the gateway node, and
the M2M application specific parameter comprises one or more of: i) device control instructions to be carried out by the M2M device and ii) mobility and session management characteristics of the M2M device.

14. The method of claim 1, wherein
the first network node is the gateway node, and
the second network node is the MTC server.

15. The method of claim 1, wherein
the first network node is the gateway node,
the second network node is the M2M device, and
the M2M application specific parameter comprises one or more of: i) device control instructions to be carried out by the M2M device and ii) mobility and session management characteristics of the M2M device.

16. The method of claim 1, wherein
the first network node is one of: the gateway node and the MTC server, and
the M2M application specific parameter comprises one or more of: i) information indicating the address of an MTC server and ii) information indicating the domain name of the MTC server.

17. The method of claim 1, wherein
the first network node is one of: the gateway node and the MTC server, and
the M2M application specific parameter comprises information indicating that the M2M device should setup a PDP context periodically.

18. The method of claim 1, wherein
the M2M application specific parameter comprises one or more of: i) information indicating that the M2M device should setup a PDP context periodically, ii) information indicating the address of an MTC server, and iii) information indicating the domain name of the MTC server.

19. A first network node, for communications handling with a second network node, the first and second network nodes being comprised in a communications network, the first network node comprising:
a transmitter; and
processing circuitry configured to obtained at least one Machine-to-Machine (M2M) application specific parameter; and the processing circuitry is further configured to employ the transmitter to transmit said at least one M2M application specific parameter to said second network node, during an establishment of a communication session, wherein the at least one M2M application specific parameter is not modified during the transmission, wherein the M2M application specific parameter comprises one or more of: device control instructions to be carried out by the M2M device, mobility and session management characteristics of the M2M device, a device capability of the M2M device, an Interface Identifier (IID) portion of a full Internet Protocol version 6 (IPv6) address of the M2M device, an indication that a specific IID has been or will be used in the M2M device, and a full IPv6 address of the M2M device, the first network node is one of: an M2M device, a gateway node, and Machine-Type Communication (MTC) server, in the case that the first network node is the M2M device, the second network node is a gateway node and the M2M application specific parameter comprises one or more of: said device capability of the M2M device, said IID portion of a full IPv6 address of the M2M device, an indication that a specific IID has been or will be used in the M2M device, and a full IPv6 address of the M2M device, in the case that first network node is the MTC server, the second network node is the gateway node and the M2M application specific parameter comprises one or more of: device control instructions to be carried out by the M2M device, and mobility and session management characteristics of the M2M device, in the case that first network node is the gateway node, the second network node is one of: the M2M device and the MTC server, and in the case that first network node is the gateway node and the second network node is the M2M device, the M2M application specific parameter comprises one or more of: device control instructions to be carried out by the M2M device, and mobility and session management characteristics of the M2M device.

20. The first network node of claim 19, wherein the establishment of the communication session is a Packet Data Network (PDN) connection or a Packet Data Protocol (PDP) context communication establishment.

21. The first network node of claim 19, wherein the communications network is an Internet Protocol version 4 (IPv4) or an Internet Protocol version 6 (IPv6) network.

22. The first network node of claim 19, wherein the transmitting is performed with a Protocol Configuration Option (PCO).

23. The first network node of claim 19, wherein the mobility and session management characteristics of the M2M device comprises one or more of: i) information indicating that the M2M device should setup a PDP context periodically, ii) information indicating the address of an MTC server, and iii) information indicating the domain name of the MTC server.

24. The first network node of claim 23, wherein the processing circuitry is further configured to employ the transmitter to forward to an MTC server received data that was reported by the M2M device.

25. The first network node of claim 23, wherein the processing circuitry is further configured such that, in response to the first network node receiving Internet Protocol version 6 (IPv6) address information transmitted by the M2M device, the processing circuitry employs the transmitter to forward the received IPv6 information to a server, wherein the received IPv6 information comprises one or more of: an Interface Identifier (IID) portion of a full Internet Protocol version 6 (IPv6) address of the M2M device, an indication that a specific IID has been or will be used in the M2M device, and a full IPv6 address of the M2M device.

26. The first network node of claim 19, wherein the first network node is a Gateway General Packet Radio Service Support Node (GGSN).

27. The first network node of claim 26, wherein the processing circuitry is configured to receive said at least one M2M application specific parameter from a M2M application server, a Machine-Type-Communication (MTC) server, a Service Capability Server (SCS) server, a Remote Authentication Dial In User Service (RADIUS) server, and/or an Authentication, Authorization and Accounting (AAA) server.

28. The first network node of claim 19, wherein the first network node is a Packet Data Network Gateway (PGW).

29. The first network node of claim 19, wherein the first network node is further configured to receive, from a M2M device, the at least one M2M specific parameter.

30. The first network node of claim 29, wherein
the first network node is a M2M device and the second network node is a Gateway General Packet Radio Service Support Node (GGSN) or a Packet Data Network Gateway (PGW), and
the at least one M2M specific parameter is data reported by the M2M device.

31. The first network node of claim 19, wherein
the M2M application specific parameter comprises one or more of: i) information indicating that the M2M device should setup a PDP context periodically, ii) information indicating the address of an MTC server, and iii) information indicating the domain name of the MTC server.

* * * * *

UNITED STATES PATENT AND TRADEMARK OFFICE
CERTIFICATE OF CORRECTION

PATENT NO.       : 9,107,025 B2
APPLICATION NO.  : 13/527607
DATED            : August 11, 2015
INVENTOR(S)      : Segura et al.

Page 1 of 1

It is certified that error appears in the above-identified patent and that said Letters Patent is hereby corrected as shown below:

Title page,

On Page 2, Item (56), under "OTHER PUBLICATIONS", in Column 1, Line 6, delete "Telefron" and insert -- Telefon --, therefor.

On Page 2, Item (56), under "OTHER PUBLICATIONS", in Column 2, Line 15, delete "Genertation" and insert -- Generation --, therefor.

On Page 2, Item (56), under "OTHER PUBLICATIONS", in Column 2, Line 19, delete "docuement." and insert -- document. --, therefor.

In the specification,

In Column 11, Line 51, delete "2006," and insert -- 200B, --, therefor.

In Column 12, Line 34, delete "2008," and insert -- 200B, --, therefor.

In the claims,

In Column 14, Line 47, in Claim 3, delete "and or" and insert -- and/or --, therefor.

In Column 15, Line 65, in Claim 19, delete "obtained" and insert -- obtain --, therefor.

Signed and Sealed this
Fifth Day of April, 2016

Michelle K. Lee
*Director of the United States Patent and Trademark Office*